(12) United States Patent
Mendes de Araujo et al.

(10) Patent No.: US 10,371,086 B2
(45) Date of Patent: Aug. 6, 2019

(54) PISTON RING FOR IMPROVED LUBRICATION OIL CONSUMPTION

(71) Applicant: Mahle International GmbH, Stuttgart (DE)

(72) Inventors: Fabio Mendes de Araujo, Waterford, MI (US); Erich John Rabassa, South Lyon, MI (US); Kaushik Kirana Prasad, Dearborn, MI (US)

(73) Assignee: Mahle International GmbH (DE)

( * ) Notice: Subject to any disclaimer, the term of this patent is extended or adjusted under 35 U.S.C. 154(b) by 648 days.

(21) Appl. No.: 15/087,766

(22) Filed: Mar. 31, 2016

(65) Prior Publication Data

US 2017/0284331 A1  Oct. 5, 2017

(51) Int. Cl.
| | |
|---|---|
| *F02F 1/18* | (2006.01) |
| *F02F 3/00* | (2006.01) |
| *F16J 9/12* | (2006.01) |
| *F16J 9/00* | (2006.01) |
| *F16J 9/20* | (2006.01) |

(52) U.S. Cl.
CPC ............. *F02F 1/18* (2013.01); *F02F 3/0015* (2013.01); *F16J 9/00* (2013.01); *F16J 9/12* (2013.01); *F16J 9/203* (2013.01); *F02F 3/00* (2013.01)

(58) Field of Classification Search
CPC .... F02F 1/18; F02F 3/0015; F02F 3/00; F16J 9/203; F16J 9/00; F16J 9/12
See application file for complete search history.

(56) References Cited

U.S. PATENT DOCUMENTS

| | | | |
|---|---|---|---|
| 1,691,746 A | | 11/1928 | Wasson |
| 3,942,808 A | * | 3/1976 | Gross .......................... F16J 9/20 |
| | | | 277/446 |
| 3,980,310 A | | 9/1976 | Packard et al. |

(Continued)

FOREIGN PATENT DOCUMENTS

| | | |
|---|---|---|
| DE | 3305873 A1 | 2/1984 |
| DE | 3836796 A1 | 10/1989 |

(Continued)

OTHER PUBLICATIONS

German Search Report dated Jan. 15, 2018 for P102C16014DE citing foreign references.

(Continued)

*Primary Examiner* — Hung Q Nguyen
(74) *Attorney, Agent, or Firm* — Fishman Stewart PLLC

(57) ABSTRACT

A piston assembly for an internal combustion engine includes a cylinder bore and a piston having a plurality of ring grooves, and a ring positioned within a ring groove. The ring includes a cross-section having a lower surface and an outer radial surface that form a scraping corner, an inner radial surface, and an upper surface. The upper surface and the lower surface are generally parallel with one another, and both upper and lower surfaces form a positive first angle with respect to a radial axis, and the outer radial surface forms a second positive angle with respect to a central axis. A constant twist occurs in the ring about a rotational center of the cross-section, the constant twist occurring at each cross-sectional location of the ring about the circumference of the ring and between adjacent free ends of the ring.

23 Claims, 4 Drawing Sheets

(56) References Cited

U.S. PATENT DOCUMENTS

| | | | |
|---|---|---|---|
| 5,752,705 A | 5/1998 | Plant | |
| 6,361,050 B1 * | 3/2002 | Sytsma | F16J 9/20 277/434 |
| 7,017,914 B1 | 3/2006 | Sytsma et al. | |
| 2013/0154196 A1 * | 6/2013 | Sytsma | B23P 15/06 277/434 |

FOREIGN PATENT DOCUMENTS

| | | | | |
|---|---|---|---|---|
| DE | 3815803 A1 | | 11/1989 | |
| DE | 4300531 C1 | | 2/1994 | |
| EP | 0927840 A1 | * | 7/1999 | F16J 9/062 |
| GB | 298259 A | | 10/1928 | |
| JP | 10252891 A | * | 9/1998 | F16J 9/203 |
| JP | 2000170602 A | * | 6/2000 | F16J 9/203 |

OTHER PUBLICATIONS

English Abstract for DE 3815803 A1.
English Abstract for DE 3836796 A1.
English Abstract for DE 3305873A1.
English Abstract for DE 4300531C1.

* cited by examiner

PISTON RING FOR IMPROVED LUBRICATION OIL CONSUMPTION

BACKGROUND

Internal combustion engine manufacturers are constantly seeking ways to improve the longevity and reliability of their engines. One method of improving an engine's longevity is to include oil control rings on the pistons of the internal combustion engine. Oil control rings perform the functions of minimizing oil consumption while ensuring sufficient lubrication between the piston and the cylinder wall. To minimize oil consumption, the oil control rings scrape oil from the cylinder wall during the downstroke of the piston in the direction of the oil chamber. On the upstroke the oil control rings slide over the oil to avoid scraping it. The oil control rings ideally maintain a minimal oil film between the oil control ring and the cylinder wall during operation.

Oil control ring design maintains a compromise between reducing oil consumption and maintaining sufficient lubrication over the life of the engine. Excessive wear on the oil control ring outer radial surface may widen the gap between the oil control ring and the cylinder wall. This excessive wear can have a negative impact on the oil consumption of the engine. It is therefore desirable to minimize the amount of wear the oil control ring experiences during its operational lifespan.

When operating at high speed, rings can experience either excessive blowby or excessive oil consumption, depending on the load. Blowby can occur due to distortion of the ring, in which combustion gases blow past the ring. Excessive oil consumption can occur if insufficient scraping occurs during the downstroke, leaving oil on the combustion side of the piston. To improve oil control ring operation, some known designs include a positively twisted ring.

A twisted ring can be beneficial to reduce blowby and oil consumption. That is, during the downstroke operation the ring may dynamically twist, which can cause an increased angular orientation of the ring against the wall. In such fashion the scraping is improved because the distortion of the ring can force the ring outward and against the cylinder wall, improving the scraping effect. The opposite occurs on the sliding upstroke, where the amount of distortion in the ring reduces, which can slightly pull the ring inward and reduce its propensity to scrape oil. As such, both oil consumption and blowby are improved in a twisted ring design.

One known twisted ring design includes a chamfer or step that is formed in the inner/uppermost corner of the ring that is diagonal from the corner that scrapes during the scraping motion. As a conventional ring distorts during operation (and particularly during the downstroke), the mass of the ring diagonal to the scraping corner causes increased and possibly nonuniform distortion in the ring. As such, by removing material in the inner and uppermost corner of the ring in a twisted ring design, the propensity to nonuniformly distort may be reduced or removed, and a generally uniformly variable twist occurs in the ring about its circumference during the downstroke. The circumferential twisting effect, however, can cause a twist that is typically a minimum near the break in the ring and a maximum at approximately 180° from the break. Accordingly, such designs typically include tradeoffs where, in a design to obtain sufficient scrape near the break in the ring, excess scraping (and therefore excess wear) may occur at the maximum twist location. However, in a design meant to reduce the excess scraping at the maximum location insufficient contact may occur near the break during the upstroke, which can lead to blowby in that portion of the ring.

As such, there is a need to improve piston ring designs.

BRIEF DESCRIPTION OF THE DRAWINGS

Referring now to the drawings, illustrative examples are shown in detail. Although the drawings represent the exemplary illustrations described herein, the drawings are not necessarily to scale and certain features may be exaggerated to better illustrate and explain an innovative aspect of an exemplary illustration. Further, the exemplary illustrations described herein are not intended to be exhaustive or otherwise limiting or restricting to the precise form and configuration shown in the drawings and disclosed in the following detailed description. Exemplary illustrations of the present invention are described in detail by referring to the drawings as follows.

DETAILED DESCRIPTION

Figure 1:
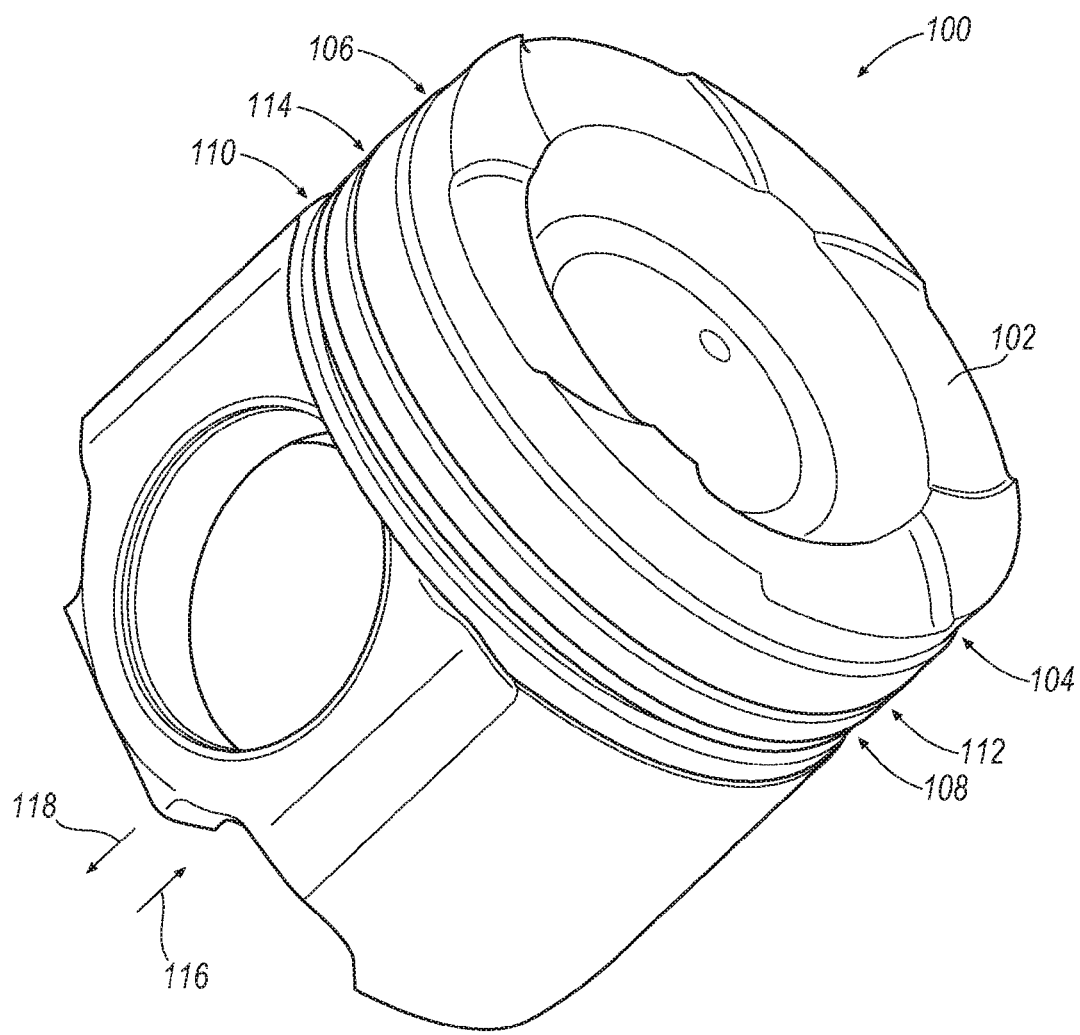
FIG. 1 is a view of an exemplary piston assembly.

Reference in the specification to "an exemplary illustration", an "example" or similar language means that a particular feature, structure, or characteristic described in connection with the exemplary approach is included in at least one illustration. The appearances of the phrase "in an illustration" or similar type language in various places in the specification are not necessarily all referring to the same illustration or example.

Various exemplary illustrations are provided herein a piston assembly having two or more rings that, when positioned within the grooves of the piston assembly provide various functions during piston operation. In one example, a piston assembly may have two rings that include a combustion ring and a scraping ring. The combustion ring typically blocks a majority of combustion gases from passing the piston assembly of an internal combustion engine, so that there is little or no transfer of gasses to the crank. The scraping ring provides a scraping motion during a downward motion of the piston assembly, and a sliding motion during an upward motion of the piston assembly.

In another example, a three ring piston assembly includes a combustion ring, an oil control ring, and a scraping ring positioned between the combustion ring and the oil control ring. The third or lower oil control ring controls the supply of oil to a liner, which lubricates the piston skirt and the other rings.

In some exemplary approaches, a piston assembly may include a piston head having first and second compression ring grooves, compression rings within the grooves, an oil control ring groove, and an oil control ring assembly.

Disclosed is a design of an oil scraper ring that overcomes the drawbacks associated with scraper ring distortion. Due to the unique design of the cross-section of the disclosed scraper ring, the ring flexes when installed and dynamically flexes during operation to improve oil scraping against a cylinder bore. That is, a force is generated against the ring that is constant about its circumference—when first installed and then during a reciprocal and dynamic operation. The behavior of the disclosed ring is akin to the operation of a spring that flexes during operation. Flexing in one direction causes an improved scraping motion, and flexing (or relaxing) in the other direction causes an improved sliding motion over the film of oil within the cylinder.

The constant circumferential force causes the ring to flex with a constant twist about an axis of rotation defined at each cross-sectional location of the ring about its entire circumference between adjacent free ends, resulting in a constant scraping effect. Having a constant scraping effect about the circumference of the ring allows for an improved scraper ring design and operation. As mentioned above, in a scraper ring design when non-uniform twist occurs, the ring is designed typically for extremes of operation about its circumference, which can result in possibly excess scraping in some portions of the ring, and possible blowby in other portions of the ring. The disclosed design avoids these pitfalls by providing a design having a constant scraping force about the entire ring circumference.

The dynamic sliding motion is improved as well. As the ring flexes during the upstroke of the piston assembly, the scraper ring slides over the film of oil and any scraping effect is minimized. Thus, as the ring twists, it does so in a constant fashion about its circumference, and the propensity to scrape excess oil in circumferential portions of the ring is reduced or removed entirely.

Thus, not only is the scraping itself improved and the extremes of operation about the circumference are avoided, but the sliding motion is improved as well during the sliding operation. As such, an optimal amount of scraping and sliding is achieved about the entire ring, due to the ring assuming, in its flexed state, a constant radial twist that occurs over its circumference and between the ends of the ring, resulting in enhanced ring life and improved engine performance.

Referring to FIG. 1 an exemplary piston assembly 100 is illustrated. Piston assembly 100 includes a piston head 102 including an upper compression ring 104 positioned within an upper compression ring groove 106, and an oil control ring 108 positioned within a lower compression ring groove 110. The piston head 102 further includes a scraping or scraper ring 112 positioned within a middle groove 114. That is, the disclosed scraper ring 112 may be optimally placed within the middle groove 114, as will be further described. The rings 104, 108, and 112 seal against cylinder bore surfaces during reciprocal motion of the piston assembly 100 within a cylinder bore. The piston head 102 moves in a first or upward direction 116 during the upstroke phase of the piston assembly 100 and a second or downward direction 118 during the downstroke phase of the piston assembly 100.

Figure 2A:
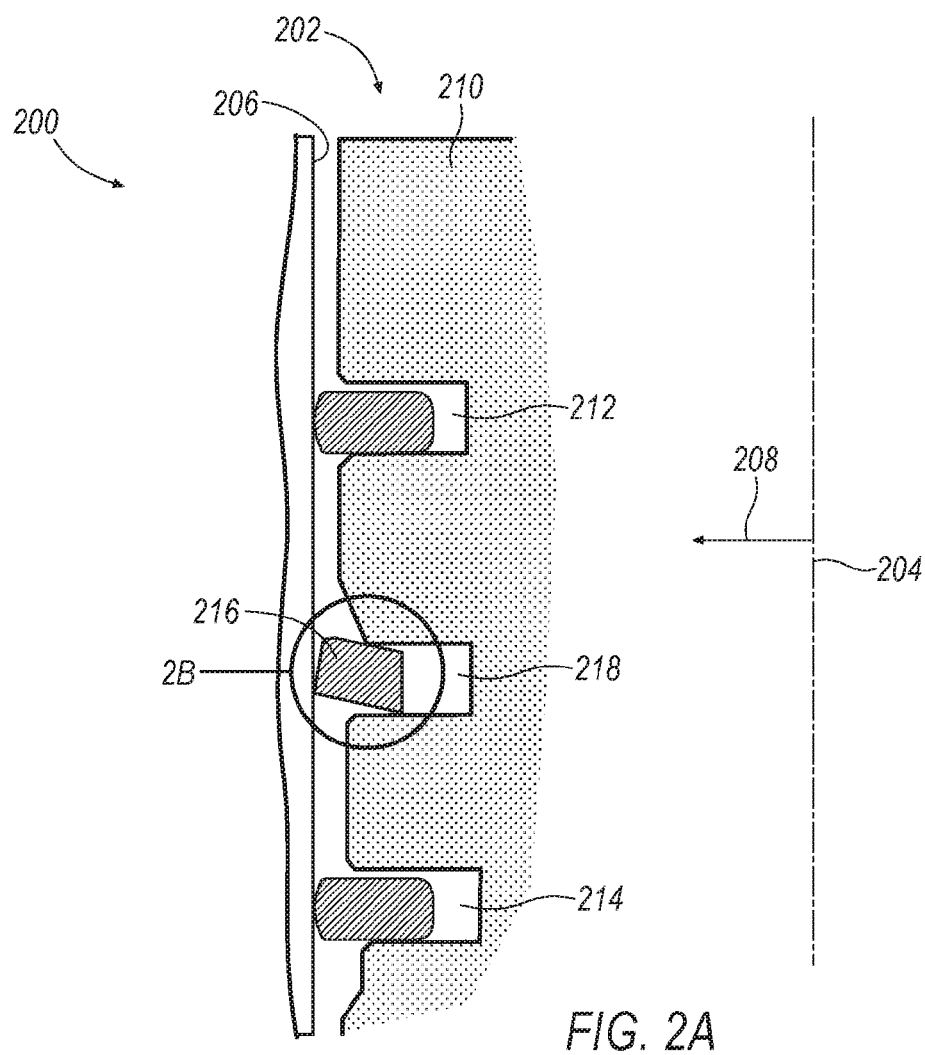
FIG. 2A is a view of the rings of the piston assembly of FIG. 1.

Referring now to FIG. 2A, a piston assembly 200 for an internal combustion engine includes a cylinder bore 202 having a central axis 204 and a cylinder wall 206 that is equidistant from the central axis 204. The piston assembly 200 includes a radial axis 208 that is orthogonal to central axis 204. The piston assembly 200 includes a piston 210 having two or more ring grooves, including a combustion ring and groove 212, an oil control ring and groove 214, and a scraper ring 216 positioned within a scraper ring groove 218.

Figure 2B:
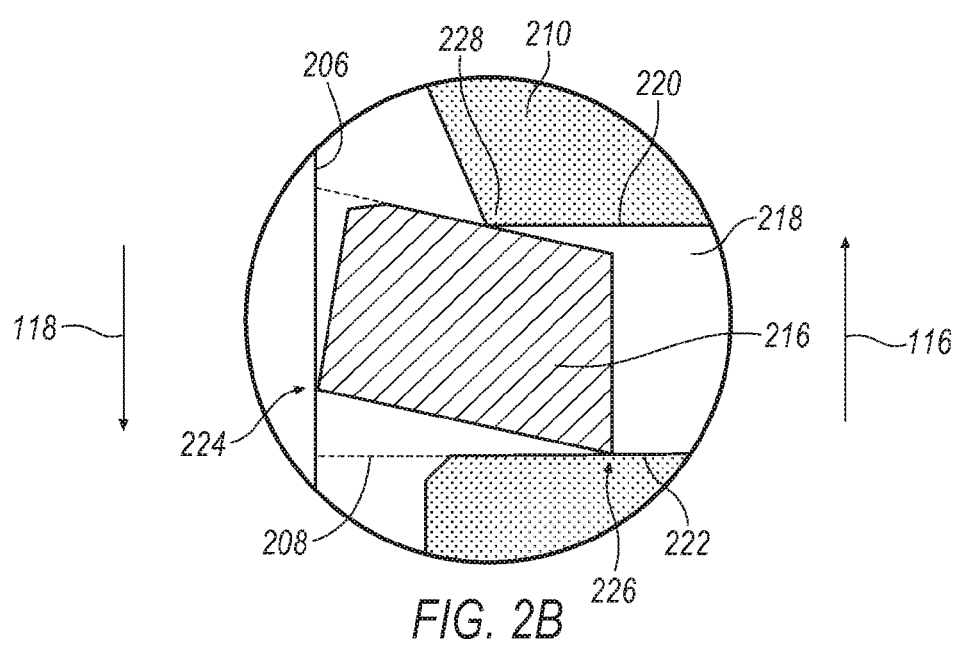
FIG. 2B is a cross-sectional view of an oil scraping ring.

Details of a cross section of scraper ring 216 are shown in FIG. 2B. Referring to FIG. 2B, groove 218 is formed between an upper groove surface 220 and a lower groove surface 222. Scraper ring 216 is positioned within groove 218 such that the scraper ring is constrained against upper groove surface 220 when piston 210 moves in downward direction 118 (corresponding with FIG. 1), and scraper ring 216 is constrained against lower groove surface 222 when piston 210 moves in upward direction 116. In one exemplary approach as illustrated herein, scraper ring 216 is positioned within groove 218, between groove 212 and groove 214. In general, when there are three ring grooves the ring in groove 212 is likely a combustion ring that serves primarily to prevent combustion gases from passing beyond piston 210. The ring in groove 214 typically serves primarily as an oil control ring that controls the distribution of oil for lubrication purposes. Thus, if general practice is followed, ring 216 may be placed in intermediate groove 216. Further, although scraper ring 216 is illustrated in a three-ring design, it is contemplated that scraper ring 216 may also be implemented in other multi-groove designs such as a two-ring groove mechanism, having only a combustion ring and the disclosed scraper ring 216, which would then serve as an oil control ring, as well.

As will be further described, scraper ring 216 includes a cross-sectional profile that significantly reduces or eliminates the amount of non-uniform twist that occurs about a circumference of scraper ring 216, when statically installed, and also during motion of piston 210 in both upward direction 116 and downward direction 118. When piston 210 moves in the upward direction 116 prior to combustion, scraper ring 216 slides against cylinder wall 206 and, owing to its shape, a film of oil (not shown) on cylinder wall 206 is slid or glided over, and not scraped, such that the film of oil is not pulled by scraper 216 when piston 210 moves in upward direction 116. When traveling in the downward direction 118, scraper ring 216 scrapes against cylinder wall 206, causing oil to be scraped downward and in motion with piston 210.

Figure 3A:
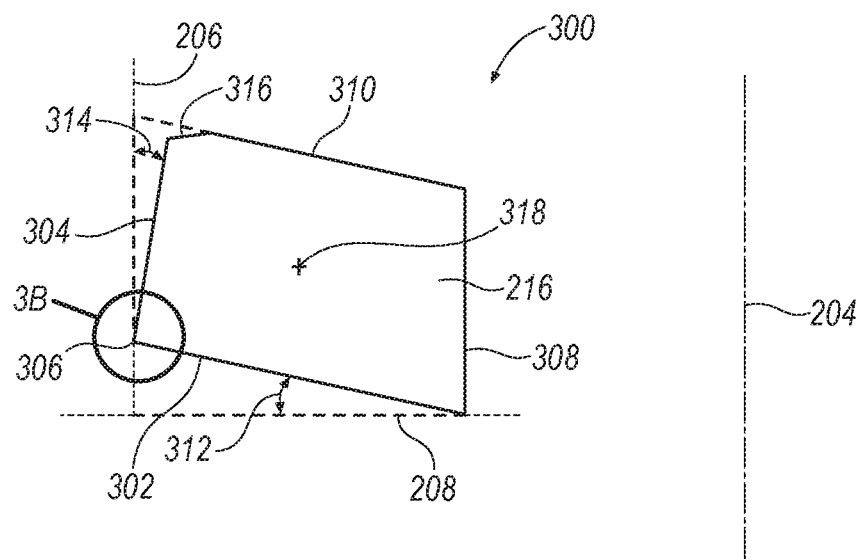
FIG. 3A is a detailed discussion of aspects of the cross-sectional view of an oil scraping ring.
Figure 3B:
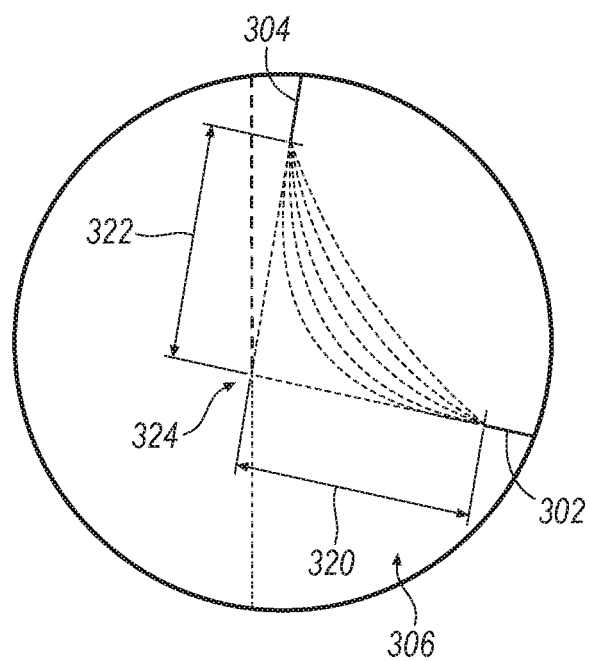
FIG. 3B is an enlarged view of the scraping corner of the oil scraping ring of FIG. 3A.

Referring now to FIG. 3A, a cross-section 300 of scraper ring 216 is shown. FIG. 3 shows scraper ring 216 in its unflexed or relaxed static state. FIGS. 2A and 2B, also show scraper ring 216 in its relaxed shape when unflexed. However, as will be further described, scraper ring 216 absorbs energy by flexing against its tendency to desire to return to its static state during certain portions of a piston cycle operation. More specifically, it is subjected to various forces applied thereto as a result of its contact with cylinder wall 206, and corresponding engagement surfaces within groove 218.

Figure 4:
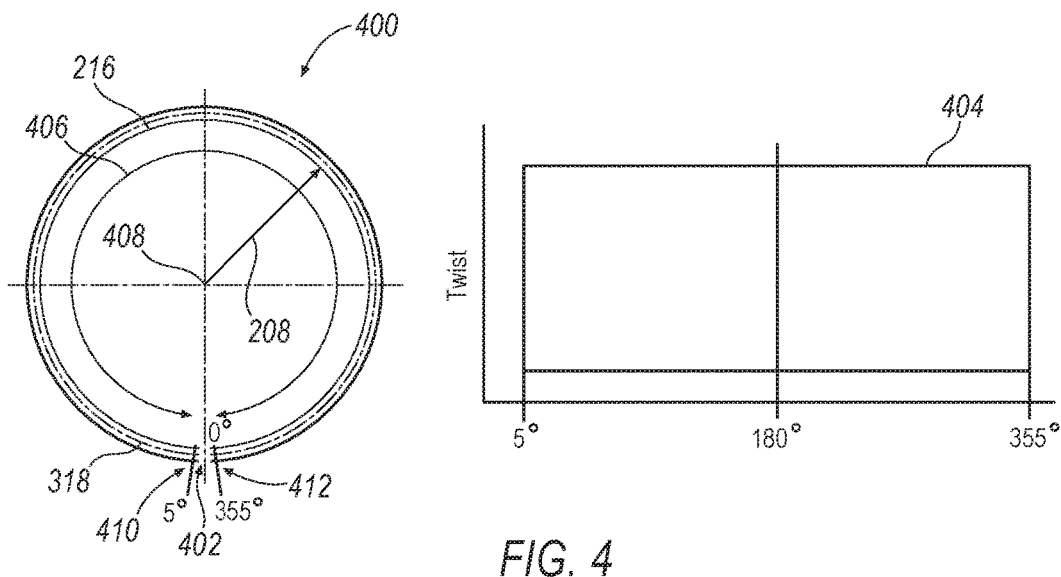
FIG. 4 is a plan view of the oil scraping ring of FIG. 3 and a corresponding illustration of uniform twist about its circumference in a static form when the ring is installed to piston bore.

In one form cross-section 300 includes a lower surface 302 and an outer radial surface 304 that form a scraping corner 306. Cross-section 300 includes an inner radial surface 308 and an upper surface 310. In the example illustrated, the upper surface 310 and the lower surface 302 are generally parallel with one another. That is, within the commercially acceptable tolerances achievable with mass production machining practices, upper surface 310 and lower surface 302 are parallel. Having upper and lower surfaces 310, 302 parallel with one another is one aspect of the design that allows for the constant twist of scraper ring 216 to occur about its circumference during operation. That is, scraper ring 216 has the same thickness as one moves along its radial direction from an inner periphery of the ring to an outer periphery of the ring, making scraper ring 216 less "flimsy" than if the thickness is varied. Thus the propensity of the ring to distort about its circumference 406 when first installed and as it is flexed about an axis or rotational center 318, as shown in FIGS. 3A and 4, and discussed in more detail below, has been found to be minimized.

Also, both upper and lower surfaces 310, 302 form a positive first angle 312 with respect to radial axis 208. More specifically, first angle 312 is defined as positive, in that lower surface 302 and upper surface 310 each extend upward from the position of radial axis 208 and extend away from inner radial surface 308. The outer radial surface 304 forms a second angle 314 with respect to the central axis 204. As seen therein, second angle 314 is defined with respect to cylinder wall 206, scraper ring 216 contacts the cylinder wall 206 at the location of the scraping corner 306, and second angle 314 is defined as extending upwardly and inwardly from there. Second, angle 314 is shown as having a positive angle as extending upward and inward from its constant point with cylinder wall 206.

In addition, the scraping corner 306 may define a sharp corner as illustrated in FIG. 3A. However, in other forms the scraping corner 306 may define an edge radius or chamber with various reliefs shapes varied from 0.2 mm or less from the sharp corner, as illustrated in the enlarged view of FIG. 3B. The edge profile can having differing geometries from a constant radius, to various contours starting from 0.2 mm from the sharp corner. That is, scraping corner 306 in various examples includes a relief in which a first distance 320 and a second distance 322 may define an approximate region for the relief based on a manufacturing ability to machine a sharp corner. First and second distances 320, 322 may be approximately 0.2 mm as examples but may deviate slightly from an ideal or hypothetical sharp corner based on machining and manufacturing capabilities. That is, the hypothetical sharp corner 324 may be a point or edge that is formed at an intersection or hypothetical point of outer radial surface 304 and lower surface 302.

Referring still to FIG. 3A, the first and second angles 312, 314 have different angular values from one another in the illustrated approach, but in another illustrative approach angles may have the same value. In one illustrative example, the first angle 312 is less than 5° and may be approximately 0.5°, ±0.2°. In another illustrative example, the first angle may be in a range between 0.1° and 8°, and in some forms the first angle may be different for each of the upper and lower surfaces resulting in a non-parallel relationship between the upper and lower surfaces within the first angle range. Additionally, in another example the second angle 314 is less than 4°, and the second angle 314 may be preferably approximately 1°, ±0.2°. That is, by stating the angles are approximate angles, it is contemplated that the angles may be within approximately ±0.2° of the nominal value. As such, it has been determined that the disclosed nominal angular values for first angle 312 and second angle 314 result in a constant flexing of scraper ring 216 about axis 318 shown in FIGS. 3A and 4 at any point along its circumference between adjacent opposing free ends 410, 412 of the ring (i.e., not including break or gap 402), with the approximate angles being established as within normal machining operations. More specifically, axis 318 represents an axis about which cross-section 300 rotates during the reciprocation of the piston 210. Thus, so long as positive scraping forces are maintained during the scraping operation, and sufficient relaxation of the ring occurs during the sliding motion, the positive angular values may be selected within the disclosed bounds.

Referring back to FIG. 2B, when first statically installed and during operation (whether the upstroke or the downstroke), scraper ring 216 engages against cylinder wall 206 at a line of engagement shown by a point 224 in two dimensions. In the downstroke of piston 210, scraper ring 216 is bound within groove 218, contacting and forcing scraper ring 216 to engage at groove contact points 226 and 228. Being pressed upward against groove 218, scraper ring 216 is thereby constrained and, owing to the generally parallel walls or surfaces 302, 310, as well as the optimally selected first angle 312, the scraper ring 216 twists about its cross-section and uniformly about the circumference of the ring, creating a consistent line of engagement between the edge of the scraper ring and corresponding wall surface of cylinder wall 206 about the entire circumference of the ring.

In the upstroke of piston 210, the forces at engagement points 226, 228 relax, and scraper ring 216 is pulled upward but glides in a much gentler fashion over cylinder wall 206, when compared to the forces generated during the scraping motion. As such, second angle 314 between outer radial surface 304 and cylinder wall 206 remains positive, having a nominal angle of 1°. In such fashion, during the upstroke of piston 210, second angle 314 will always remain positive, avoiding any propensity to cause a scraping action. First angle 312 is selected based on the ability of scraper ring 216 to become bound within groove 218 during the scraping motion. Second angle 314 is selected independently from the selection of first angle 312, and is selected based on the ability of scraper ring 216 to slide during the sliding operation.

According to one additional illustrative example, cross-section 300 includes a chamfer or cutaway 316. Chamfer 316 reduces stress within scraper ring 216 during operation, and particularly during the scraping motion, by reducing the stress risers that otherwise may occur if surfaces 304 and 310 instead came to a point or corner. In addition, chamfer 316 serves to improve the sliding motion of scraper ring 216 when piston 210 is moving in upward direction 116, while allowing for an improved sliding action over cylinder wall and providing a location or minor reservoir area where oil may be collected, should any oil be pulled along during the sliding action.

Referring now to FIG. 4, a plan view 400 of scraper ring 216 is shown, having a break 402 at a reference position defined as 0° and increasing clockwise. Owing to the cross-sectional features of scraper ring 216 as discussed previously, a uniform amount of twist is induced within scraper ring 216 when installed on to the piston or closed down to the bore diameter of the cylinder. The scraper ring 216, during the scraping motion, maintains a more uniform amount of twist, but due to the reciprocating and variation in the cylinder may impart a degree of variation. Thus, the uniform disposition of the scraper ring 216 is maintained about the circumference of the ring.

That is, when piston 210 moves in the downward direction 118, then the scraping corner 306 contacts cylinder wall 206 in a fashion in which twist of scraper ring 216 is constant and uniform 404 about a circumference 406 of scraper ring 216, adjacent up to but not including the free ends 410, 412 that are in a region defined as approximately 5° in either direction of circumference 406 and spaced away from the break 402. Break 402 in scraper ring 216 occurs to enable attachment of scraper ring 216 within its groove 218, while allowing some play in the ring to permit scraper ring 216 to twist as described. However, due to modest end effects in the end parts of the ring where they meet (approximately ±5° of its circumference), it is contemplated that some non-uniform distortion of the ring may occur. Thus, a constant twist occurs over the majority of the circumference of scraper ring 216, significantly improving scraping and sliding of the disclosed ring 216, and its unique design characteristics as described, compared to previous designs. Aside from the locations where end effects may occur, no matter what cross-sectional location about the circumference of the ring, a constant force is applied to the scraping ring in both up and down stroke directions, resulting in a constant twist about its cross section due also to the disclosed design that flexes uniformly as a result of the applied force.

Figure 5:
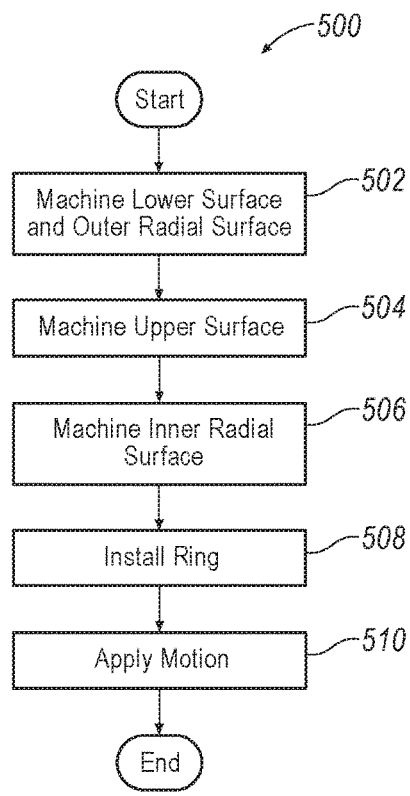
FIG. 5 is a method of fabricating an oil scraping ring as disclosed herein.

FIG. 5 illustrates a method 500 of fabricating scraper ring 216 that includes machining the various details of scraper ring 216, as described above. It is contemplated that scraper rings are commonly fabricated in a stamping process for bore diameters that are less than 110 mm. However, for larger bore engine designs, such as having a bore diameter greater than 110 mm, the disclosed examples are instead machined. Method 500 includes a step 502 of machining a lower surface and an outer radial surface of the ring to form a scraping corner, and step 504 includes machining an upper surface to be approximately parallel with the lower surface in a cross section of scraper ring 216. Step 506 includes machining an inner surface of the ring. Referring to the previous FIGS. 1-3A, upper surface 310 and lower surface 302 are machined to form first angle 312 with respect to radial axis 208 of scraper ring 216. The radial axis 208 extends radially from a centroid 408 of scraper ring 216. Central axis 204 of bore 202 corresponds with and generally passes through centroid 408, and central axis 204 is orthogonal to radial axis 208. Outer radial surface 304 is machined to form second angle 314 with respect to central axis 204. In one example, the lower surface 302 and the outer radial surface 304 are machined such that the first and second angles 312, 314 are different from one another. The first angle 312 is machined to be less than 1°, and is approximately 0.5° in one example. The second angle is machined to be less than 2°, and is approximately 1°, as described above. Accordingly, with properly machined angles, tolerances, and faces with respect to one another, the benefits of scraper ring 216 and its operation described above accrue to a ring machined as described.

Thus, at step 508 scraper ring 216 is installed within groove 218 of piston 210 and is in a static state before any reciprocating operation of the piston. That is, the static state refers to its state when contained within groove 218 but before a reciprocating operation. Piston 210 may be operated in a reciprocating fashion, which is in both upward direction 116 and downward direction 118. At step 510 the reciprocating motion is applied, causing the ring to move from its static state to a dynamic flexed state. The flexed states are typically different in each direction because the direction of forces differ as well.

For instance, when piston 210 moves in an axial and upward direction 116, then force is imparted at scraping corner 306 and in downward direction 118 that is opposite a direction of axial motion. The motion of step 510 causes the scraper ring 216 to twist from its free state to its flexed state and against groove 218 of the piston assembly 200, wherein an amount of twist in the flexed state occurs the same amount at each cross-sectional location of the ring about its circumference and between adjacent free ends thereof. When the axial motion is in upward direction 116 within the piston assembly 200, the force imparted is in downward direction 118 within the piston assembly 102, causing the positive second angle 314 to decrease in magnitude in this flexed state. When motion of step 510 is instead in the downward axial direction 118 within the piston assembly 200, the force imparted at scraping corner 306 is in upward direction 116 causing the positive first angle 312 to increase in magnitude at this flexed state.

As such, in operation and referring to the above FIGS. 1-5, piston 210 is operated by reciprocating within its cylinder. When piston 210 reciprocates in the downward direction 118, forces are generated against scraper ring 216 from cylinder wall 206, causing the scraper ring 216 to become tightly bound within groove 218. Scraper ring 216 is machined such that angle 312 is positive not only in its unflexed state, but also in its flexed state. That is, the forces imparted at point 224 against scraper ring 216 occur about the circumference of the ring and cause scraper ring 216 to react in a constant fashion about its circumference. The amount of flexing that occurs in scraper ring 216 about axis 318 is therefore constant, due not only to the uniform forces applied about the circumference, but also due to the design of the cross-section of scraper ring 216 as well.

When piston 210 reciprocates in the upward direction 116 and piston 210 slides over an oil film on cylinder wall 206, forces likewise develop in a constant fashion about the circumference of the scraper ring 216. Second angle 314 is selected within the bounds described such that, even with full relaxation of scraper ring 216 and even with any additional resulting forces pushed against scraper ring 216 during upward motion 116, a positive angle 314 is nevertheless maintained despite flexing to the flex state so that a sliding motion occurs. In other words, such an angle ensures that regardless of forces that occur during the upward motion 116 of piston 210, clearance is nevertheless maintained in the region of chamfer 316. Chamfer 316, incidentally and as described, provides a location or minor reservoir area where oil may be collected, should any oil be pulled along during the sliding action.

As such, twist in large diameter rings can be induced by machining the scraper rings instead of stamping them. Benefits include a constant twist which will lift the bottom edge of the scraper ring from the running surface when the piston is moving in the upward direction, and scraping is improved when the piston is moving in the downward direction. In some application, the rings may have a diameter that may exceed 90 mm.

Accordingly, it is to be understood that the above description is intended to be illustrative and not restrictive. Many applications other than the examples provided would be upon reading the above description. The scope of the disclosure should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the disclosure is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A piston assembly for an internal combustion engine, comprising:

a cylinder bore having a central axis and a cylinder wall that is equidistant from the central axis, and forming a radial axis that is orthogonal to the central axis;

a piston having a plurality of ring grooves; and a ring positioned within one of the plurality of ring grooves, the ring having a cross-section comprising:

a lower surface and an outer radial surface that form a scraping corner;

an inner radial surface; and an upper surface;

wherein:

the upper surface and the lower surface are generally parallel with one another, and the upper surface and the lower surface form a positive first angle with respect to a lower surface of the ring groove and with respect to the radial axis; and the outer radial surface forms a second positive angle with respect to the central axis;

such that when the ring is installed on the piston within the cylinder bore, a constant twist occurs in the ring about a rotational center of the cross-section, the constant twist occurring at each cross-sectional location of the ring about the circumference of the ring and between adjacent free ends of the ring.

2. The piston assembly of claim 1, wherein the adjacent free ends extend 5° in either direction from a gap in the ring and extend about the circumference of the ring.

3. The piston assembly of claim 1, wherein the first angle is less than 1°.

4. The piston assembly of claim 3, wherein the first angle is 0.5°.

5. The piston assembly of claim 1, wherein the second angle is less than 2°.

6. The piston assembly of claim 5, wherein the second angle is 1°.

7. The piston assembly of claim 1, wherein the scraping corner includes a relief having a contour that is less than 0.2 mm from a hypothetical corner that is formed at an intersection of the lower surface and the outer radial surface.

8. A method of fabricating a ring for a piston assembly for an internal combustion engine, the method comprising:

machining a lower surface and an outer radial surface of the ring to form a scraping corner; and machining an upper surface to be parallel with the lower surface in a cross section of the ring;

wherein the upper surface and the lower surface form a positive first angle with respect to a lower surface of the ring groove and with respect to a radial axis of the ring, the radial axis extending radially from a centroid of the ring;

wherein a central axis is formed that passes through the centroid and is orthogonal to the radial axis, and the outer radial surface forms a positive second angle with respect to the central axis;

wherein a cross-section of the ring includes a rotational center such that a constant force occurs in the ring about its circumference and between its adjacent free ends, causing a constant amount of twist about the rotational center of the ring, the axis of rotation defined at each cross-sectional location of the ring about its circumference and between the adjacent free ends.

9. The method of claim 8, wherein the adjacent free ends extend 5° in either direction from a gap in the ring and extend about the circumference of the ring.

10. The method of claim 9, wherein the first angle is less than 1°.

11. The method of claim 10, wherein the first angle is 0.5°.

12. The method of claim 9, wherein the second angle is less than 2°.

13. The method of claim 12, wherein the second angle is 1°.

14. A ring for a piston assembly, the ring having a cross-section comprising:

a lower surface and an outer radial surface that form a scraping corner;

an inner radial surface; and an upper surface;

wherein:

the upper surface and the lower surface are parallel with one another, and the upper surface and the lower surface form a positive first angle with respect to a lower surface of the ring groove and with respect to a radial axis, wherein the radial axis is defined as an axis that extends radially from a centroid of the ring; and the outer radial surface forms a second angle with respect to a central axis that is orthogonal to the radial axis;

such that a force is imparted at the scraping corner in a direction that is opposite a direction of an axial motion, causing the ring to twist from a static state to a dynamic flexed state and against a groove of the piston assembly, wherein an amount of twist in the flexed state occurs the same amount at each cross-sectional location of the ring about its circumference and between adjacent free ends thereof.

15. The ring of claim 14, wherein the adjacent free ends extend 5° in either direction from a gap in the ring and extend about the circumference of the ring.

16. The ring of claim 15, wherein when the axial motion is in a downward direction within the piston assembly, the force imparted is in an upward direction causing the positive first angle to increase in magnitude, and when the axial motion is in an upward direction within the piston assembly, the force imparted is in a downward direction within the piston assembly, causing the positive second angle to decrease in magnitude.

17. The ring of claim 15, wherein the scraping corner includes a relief having a contour that is less than 0.2 mm from a hypothetical corner that is formed at an intersection of the lower surface and the outer radial surface.

18. The ring of claim 15, wherein the first angle is less than 1° and the second angle is less than 2°.

19. The ring of claim 18, wherein the first angle is 0.5°.

20. The ring of claim 18, wherein the second angle is 1°.

21. The piston assembly of claim 1, wherein the first angle and the second angle are different from one another.

22. The method of claim 8, wherein the first angle and the second angle are different from one another.

23. The ring of claim 14, wherein the first angle and the second angle are different from one another.

* * * * *